(12) United States Patent
Kim et al.

(10) Patent No.: US 6,274,110 B1
(45) Date of Patent: *Aug. 14, 2001

(54) PROCESS FOR PREPARING AMORPHOUS COMPLEX OXIDE PRECURSORS AND PRODUCTS PRODUCED THEREFROM

(75) Inventors: Yeun Shik Kim; Geon Bae Kim; Min Young Jo, all of Seoul (KR)

(73) Assignee: Yuen Shik Kim, Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/727,459

(22) PCT Filed: Apr. 22, 1995

(86) PCT No.: PCT/KR95/00042

§ 371 Date: Mar. 11, 1997

§ 102(e) Date: Mar. 11, 1997

(87) PCT Pub. No.: WO95/29379

PCT Pub. Date: Nov. 2, 1995

(30) Foreign Application Priority Data

Apr. 22, 1994 (KR) .................................................. 94/8546
Feb. 16, 1995 (KR) .................................................. 95/2930

(51) Int. Cl.$^7$ ................................. C01F 17/00; C01F 7/02

(52) U.S. Cl. ............................................. 423/263; 423/625
(58) Field of Search .................................... 423/592, 263, 423/625

(56) References Cited

U.S. PATENT DOCUMENTS

| | | | | |
|---|---|---|---|---|
| 4,072,501 | * | 2/1978 | Quinby | 423/592 |
| 4,184,976 | * | 1/1980 | Zimmer | 423/260 |
| 4,751,070 | | 6/1988 | Verneker . | |
| 4,778,671 | * | 10/1988 | Wusirika | 423/592 |
| 4,895,832 | * | 1/1990 | Chang et al. | 423/263 |
| 5,162,299 | | 11/1992 | Pastor et al. . | |
| 5,275,759 | | 1/1994 | Osaka et al. . | |
| 5,468,427 | * | 11/1995 | Stangle et al. | 423/1 |
| 5,567,401 | * | 10/1996 | Doddapaneni et al. | 423/184 |

FOREIGN PATENT DOCUMENTS 0328742 8/1989 (EP) .
0408258 1/1991 (EP) .

* cited by examiner

Primary Examiner—Steven Bos
(74) Attorney, Agent, or Firm—Christie, Parker & Hale, LLP

(57) ABSTRACT

The present invention relates to complex oxides used as raw materials for fine ceramic materials, and more particularly to complex oxide precursors in the form of a fine powder which are readily converted to complex oxides with low energy and also a process for preparing the same.

9 Claims, 12 Drawing Sheets

(a) metal nitrates(Zn:Pr=90mol%:10mol%)
(b) metal nitrates(Zn:Pr=70mol%:30mol%)
(c) metal nitrates(Zn:Pr=50mol%:50mol%)
(d) metal nitrates(Zn:Pr=10mol%:90mol%)

(a) TiCl4 solution:HNO3:urea=0.03mol:0.12mol:0.10mol
(b) TiCl4 solution:urea=0.03mol:0.10mol

PROCESS FOR PREPARING AMORPHOUS COMPLEX OXIDE PRECURSORS AND PRODUCTS PRODUCED THEREFROM

BACKGROUND OF THE INVENTION

Field of the Invention

The present invention relates to complex oxides used as raw materials for fine ceramic materials, and more particularly to complex oxide precursors in the form of a fine powder which are readily converted to complex oxides with low energy and also a process for preparing the same.

DESCRIPTION OF THE RELATED ART

With rapid development of science and industry nowadays, many new materials of various functions have been required, and they are used in our daily lives and industry. In particular, a complex oxide is an oxide including one or more metal oxides having unique physical and chemical functions. Such complex oxides have been widely used in various fields such as mechanics, electronics, and optics for high temperature uses, capacitors, varistors, solid electrolytes, fluorescent materials, heating elements, piezoelectric materials and structural uses.

Methods to produce complex oxides include the solid phase method, the liquid phase method and the combustion method. The solid phase method is a process to produce a complex oxide by mechanical mixing with a ball mill charged with respective component oxides or in the form of carbonate salts and followed by sintering. However, the solid phase method requires many hours for mixing and also requires a relatively long time for sintering even at a high temperature. Because the mixing and the sintering costs are a large portion of the production costs, the method disadvantageously consumes a lot of energy and is inefficient. It is also difficult to mix homogeneously so that inevitably poor quality products are produced. With respect to quality management of the products, there are significant problems with impurities during the mixing step. To solve the problems of the solid phase method, the liquid phase method has been developed, which involves obtaining an intermediate product in solid form from a homogeneous solution mixture of soluble components followed by heat treatment. Examples of liquid phase methods include the thermal decomposition method, the co-precipitation method and the metal alkoxide method.

The thermal decomposition method involves obtaining a decomposed solid product by heating steadily to the decomposition temperature after mixing the metal salts of desired oxides. This method has the advantage that it is possible to synthesize at a relatively low temperature (around 1000° C.). However, it has the disadvantages that the process is complex, that longer time is required, and that there is a high possibility of contamination of impurities because raw material should be heated slowly for minimizing segregation while attaining complete decomposition.

The co-precipitation method is a method for obtaining a complex oxide by precipitating an oxide of a single element, such as yttrium or aluminium, from a salt solution of hydrochloric acid, nitric acid or sulfuric acid containing a precipitation agent, such as oxalic acid or aqueous ammonia, to produce an insoluble metal material followed by filtering, drying and calcination. However, the co-precipitation method has a drawback when preparing complex oxides comprising two or more components. It is normally difficult to determine the precipitation condition because the possibility of fractional precipitation is high due to the difference in the solubilities or precipitation velocities of the elements. It also has potential contamination problems and is difficult in mass production and continuous operations.

The alkoxide method is a method for obtaining a complex oxide by reacting metals with alcohol to give alkoxide formation and then hydrolyzing to produce a complex hydroxide in the form of a gel, followed by heating. However, the alkoxide method is restricted to certain metals and is disadvantageous because the manufacturing process for the intermediate material is not simple and the raw materials are expensive.

Additionally, there are the sol-gel method, the colloidal precipitation method where homogeneous precipitation is attained, and the spray drying method. However, the sol-gel method and homogeneous precipitation method are not suitable for mass production. The spray drying method has the problem of poor quality due to the void formation inside the granule powder.

Therefore, a process for preparing a powder by a simple method at a comparatively low temperature is focused on a process where the merits of both the solid phase method and the liquid phase method are adopted.

The combustion method is a method for obtaining the powder of a complex oxide quickly and in a simple manner by mixing a metal nitrate and urea, heating the mixture in a reactor at a comparatively low temperature (around 500° C.), and igniting the decomposed gas. However, in this method there are still the problems in obtaining quantitative synthesizing conditions, because the combustion condition can be changed according to the heating speed of the charge mix, the right mixing ratio of the materials, and also the shape and volume of the reactor. Moreover, the quality of the product is not constant because uniform combustion is not always maintained. Accordingly, there are problems remaining for industrialization. So far, only small scale synthesis (10 g) batch laboratory test results have been known. No work for large production or methods for continuous production have yet been published.

SUMMARY OF THE INVENTION

As discussed above, various processes for preparing a complex oxide, including the combustion method, are known, but only the solid phase method and alkoxide method are used in industry. The factors important in industrial application are the manufacturing cost and the product quality. In other words, if these two parameters are improved, it can be said to be an ideal industrial method. The factors of the process cost are (1) the price of material, (2) the energy cost, and (3) the price of processing, all of which should be minimized. Further, product quality should be guaranteed, not only because high recovery of the final product can be obtained, but also because reliability of the final product is assured.

It is one object of the present invention to lower the production cost while maintaining quality assurance and offering convenience for the product user, and also to reduce the plant investment and process operation costs.

It is another object of this invention to provide a complex oxide precursor capable of being used to produce a high quality complex oxide crystalline product with low energy cost.

It is a further object of the invention to provide a process for preparing a complex oxide of high quality using a complex oxide precursor in an economic and effective way. To achieve the foregoing objects of the invention, the present invention provides a process for preparing a complex oxide precursor comprising the steps of mixing a metal salt solution or the crystal thereof with urea or a carbohydrazide to produce a mixture and heating the mixture without ignition. The mixture can further include metal chloride.

In accordance with this invention, it is preferred that the rate of temperature increase in the heating step is 1° C./min to 100° C./min. If the rate of temperature increase is below 1° C./min, the heating is insufficient to produce the complex oxide precursor; if the rate is above 100° C./min, the complex oxide precursor can not be formed because of combustion action.

Metals useful for this invention include one or more metals selected from the group consisting of Ag, Al, Ba, Ca, Cd, Co, Cr, Cu, Fe, Ga, K, Li, Mg, Na, Nb, Ni, Pb, Si, Sn, Sr, Th, Ti, U, Zn, Zr and rare earth metals.

Further, the present invention provides a process for preparing a complex oxide comprising the steps of mixing a metal salt solution or the crystal thereof with urea or a carbohydrazide to produce a mixture, heating the mixture without ignition to produce a complex oxide precursor, and heating the complex oxide precursor to produce a crystallized complex oxide.

In accordance with the invention, the mixing ratio of metal nitrate to urea may be changed according to the metal (the coordination number of metal atom), and it is possible to mix at various ratios. However, it is preferred that the mole ratio of urea or carbohydrazide to metal is one or more. When the mole ratio is less than one, the securable complex oxide precursor is not produced because the second electric conductivity increment does not occur or because a homogeneous solution is not formed. Also, the present invention provides a complex oxide precursor produced according to said process.

In addition this invention can provide completely homogeneous complex oxides in the form of a fine powder at a degree of atomic mixing prepared by mixing a metal salt with urea or carbohydrazide and then heating to a relatively low temperature (around 250° C.). The resulting products can be used as raw materials for manufacturing electronic parts if necessary or can be heated to higher temperature to provide a complex oxide crystalline powder.

The above mixture of metal salts with urea or a carbohydrazide melts to solution with dehydration, and if this solution is further heated, it changes to a clear solution by chemical interaction of the components in the melt.

It is believed that it contains ionic particles because it has high conductivity in the temperature range for maintaining the clear molten solution, and the most perfect mixing of the components is achieved at this period of time. A completely homogeneous solution such as this produces flammable gas components according to the increment of the non-ignition temperature, and the powder remaining in the reactor becomes a complex oxide in the form of a fine powder with high purity and homogeneity.

BRIEF DESCRIPTION OF THE DRAWINGS

The accompanying drawings which are incorporated in and constitute a part of this specification, illustrate one embodiment of the invention and, together with the description, serve to explain the principles of the invention; wherein.

DETAILED DESCRIPTION OF THE EMBODIMENTS

The present invention will now be described more specifically with reference to the preferred embodiments described below only by way of example.

I. The Preparation of Materials

1. The Preparation of Samples

Zinc nitrate, lead nitrate, titanium nitrate, zirconium nitrate, barium nitrate, copper nitrate, chromium nitrate, terbium nitrate, nickel nitrate, cobalt nitrate, cerium nitrate, lanthanum nitrate, strontium nitrate, yttrium nitrate, aluminum nitrate, potassium nitrate, praseodymium nitrate and the like were purchased or prepared with high purity of equal to or greater than 99.9% and used as samples to produce complex oxide. To produce YAG (Yttrium Aluminum Garnet, $Y_3Al_5O_{12}$, mole ratio of components is $Y_2O_3$, 37.5% and $Al_2O_3$, 62.5%), yttrium oxide ($Y_2O_3$) of 99.99% purity, urea of purity equal to or greater than 98% (ash content less than 0.01%), and aluminium (Ingot) of 99.99% purity were dissolved in hydrochloric acid and nitric acid in reagent grade to give nitrate salts (yttrium nitrate, aluminium nitrate).

Yttrium nitrate solution was prepared by calcinating yttrium oxide($Y_2O_3$) at 850° C. and mixing it with nitric acid of the same equivalent measured precisely using chemical balance. The solution was then heated on a heating plate at about 120° C. and dissolved completely to give yttrium nitrate solution. Aluminium nitrate solution was obtained by dissolving metallic aluminium measured precisely using chemical balance in hydrochloric acid completely, adding excessive nitric acid thereto, boiling to remove chloride ions completely, and boiling it down with pouring water repeatedly to remove excess nitrate. The component material solutions prepared above and solid urea were mixed in a ratio of Y:Al:urea equal to 3:5:20 to make a storage solution, which was used in the following experiment. To produce powder material for a varistor, zinc oxide (ZnO) of 99.9% purity, potassium nitrate of 99.9% purity, metal cobalt powder of 99.9% purity, chromic acid ($CrO_3$) of 99.9% purity, and hydrated praseodymium nitrate ($Pr(No_3)_3 5H_2O$) of 99.9% purity were used. The oxides were dissolved in reagent grade nitric acid to give nitrate solution. The other complex oxides were prepared according to the same method described above.

2. Reaction Apparatus

Figure 1:
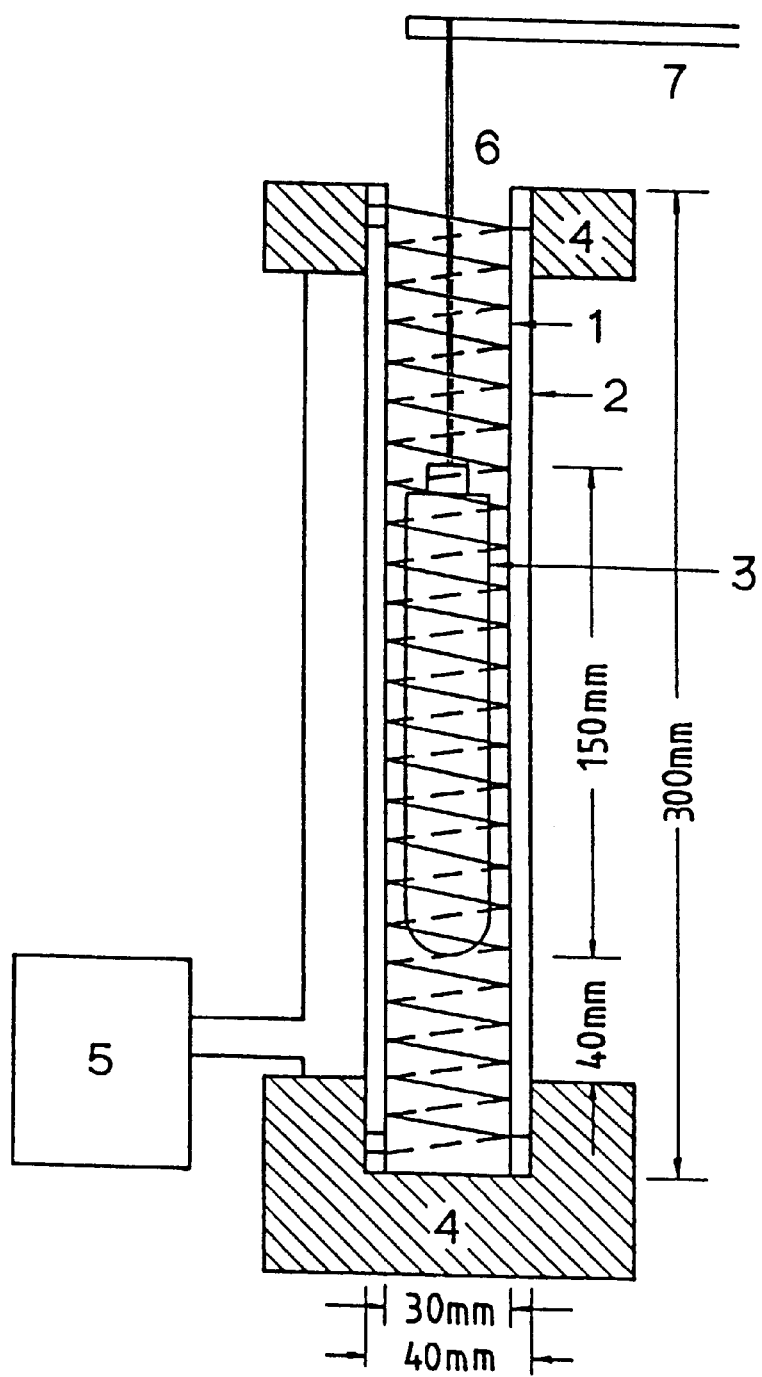
FIG. 1 is a schematic view of an experimental apparatus for observing phenomena occurring in the reaction of the present invention.

A small-scale apparatus was made so that the experiment could be observed from the outside with the naked eye during the experiment. The structure is shown in FIG. 1.

A ribbon-type heating wire (thickness of 0.16 mm, width of 1.6 mm, nichrome wire with unit resistance of 5.02 Ω/m) was coiled around a transparent quartz tube in the reactor (1) (inside diameter of 30 mm, length of 300 mm) at intervals of about 7 mm to directly observe the synthesis reaction kinetics of the precursor, and it was put in a larger quartz tube (inside diameter of 40 mm, length of 300 mm) to protect heat loss to the surroundings. A transparent pyrex tube with an inside diameter of 20 mm and a length of 150 mm or a quartz tube of the same size was used as the reactor vessel (3). A thermocouple with Pt/Pt-13% Rh having a 0.1 mm diameter was installed 5 mm above the bottom of the reactor so as to be heat sensitive for measuring the change of temperature of the reacting sample.

A variable transformer was used to adjust the temperature of the furnace, and the heating characteristics of the constructed furnace were previously examined.

A method to predict any change of the solution during the reaction was established by detecting the change of electric conductivity. The apparatus for the electric conductivity of the melt was measured using the electrode by first grafting a platinum wire of 0.5 mm in diameter with a copper wire using silver solder and putting it into a glass rod having a 5 mm diameter. The end of the glass rod was melted so that about 2 mm of the platinum wire protruded on the outside of the glass rod. The interval of exposed platinum electrode was 5 mm.

II. The Preparation of Decomposed Products Without Combustion

1. The Preparation of Decomposed Products For YAG

The mixture of yttrium nitrate solution of $Y(NO_3)_3 5H_2O$ 2.19 g and aluminum nitrate solution of $Al(NO_3)9H_2O$ 3.7513 g was added to 2.4042 g of urea and heated without being ignited for 6 minutes in a reactor at 400° C. to give 1.178 g of complex oxide precursor.

2. The Preparation of Decomposed Products For a Varistor

Cr, Co and K as trace elements were added to a Zn—Pr type oxide for a varistor. Accordingly, 5 ml of mixed nitrate solution (2M of zinc) having a mole ratio of oxides of $ZnO:Pr_6O_{11}:Cr_2O_3:CoO:K_2O$ equal to 97.2:2.0:0.25:0.25:0.3 was added to 2.3842 g of urea. The temperature of the reactor furnace was adjusted to 300° C., and the mixture was heated without ignition for about 7 minutes to prepare about 1.582 g of complex oxide precursor.

Figure 2A:
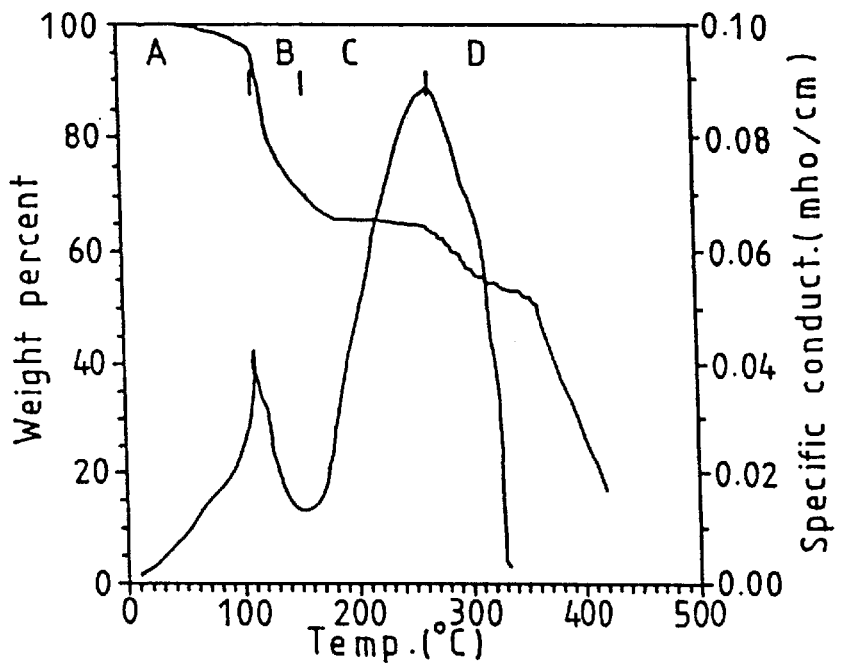
FIG. 2A is a graph of the electric conductivity and weight loss of the solution as a function of temperature when the ratio of zinc nitrate to urea is 1:1.671.
Figure 2B:
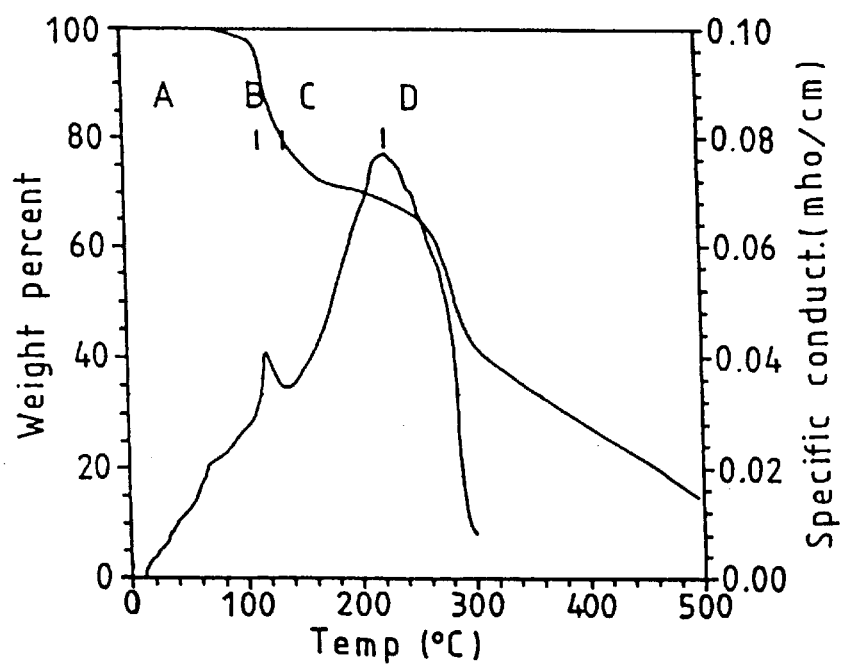
FIG. 2B is a graph of the electric conductivity and weight decrease when the ratio of zinc nitrate to urea is 1:3.33.

III. The Analysis of Formation Process For Decomposed Products of Zinc Nitrate and Urea Using the tubular furnace and electric conductivity measuring apparatus shown in FIG. 1 to study the formation process for the complex oxide precursor of the present invention, mixtures having mixing ratios of zinc nitrate to urea of 1:0.5, 1:1, 1:1.67 and 1:3.33 were put into a pyrex tube having a 2.0 cm diameter and 15 cm length, and then put into a reactor maintained at 400° C. The temperature and electric conductivity as a function of reaction progress were examined, and the reaction was traced using infrared spectroscopy and DTA for the intermediate product. The homogeneous melt was not formed at a mixing ratio of less than 1:1.67. Accordingly, the reactions for the mixtures having mixing ratios of 1:1.67 and 1:3.33, where homogeneous melts were formed, are explained stepwise in FIG. 2A and FIG. 2B. FIG. 2A is a drawing showing the electric conductivity and weight loss when the ratio of zinc nitrate to urea is 1:1.67, and FIG. 2B is a drawing showing the electric conductivity and weight loss when the ratio of zinc nitrate to urea is 1:1.33.

In order to analyze the third step of the reaction, the decomposition reactions of the mixtures having a mixing ratio of lead nitrate to urea of 1:1.67 where one was lead nitrate anhydride and the other was lead nitrate solution, were examined under the same reaction conditions as the mixture of zinc nitrate and urea mentioned above. The results were as follows:

1. The First Step

Heating Stage

The first step, illustrated as "A" in FIG. 2A and FIG. 2B, is the step where the mixture of zinc nitrate and urea was heated and dissolved by hydrated water in zinc nitrate, and before this solution was boiled therein. As shown in these drawings, the electric conductivity was increased as temperature increased, but weight loss was not observed. There are two factors influencing the increase of electric conductivity in this step: the increase of ion activity in the solution with increased temperature and the decrease of viscosity according to the destruction of water structure by urea molecule.

2. The Second Step

The Formation Stage of a Homogeneous Melt

The second step, illustrated as "B" in FIG. 2A and FIG. 2B, is the step where the weight was greatly decreased by sudden evaporation of water, and the electric conductivity was decreased because the temperature of the mixture became equal to or greater than 100° C., due to the fact that the hydrated water of metal ion is removed and the urea dissolved in water occupies the positions of the water molecules. The electric conductivity is decreased by ion association according to the increase of ionic concentration due to evaporation of water.

3. The Third Step

The Stage of Maintaining a Homogeneous Melt

The third step, illustrated as "C" in FIG. 2A and FIG. 2B, is the step where the electric conductivity is increased greatly and no weight loss was observed. It is caused simply by the increase of the temperature.

Figure 3A:
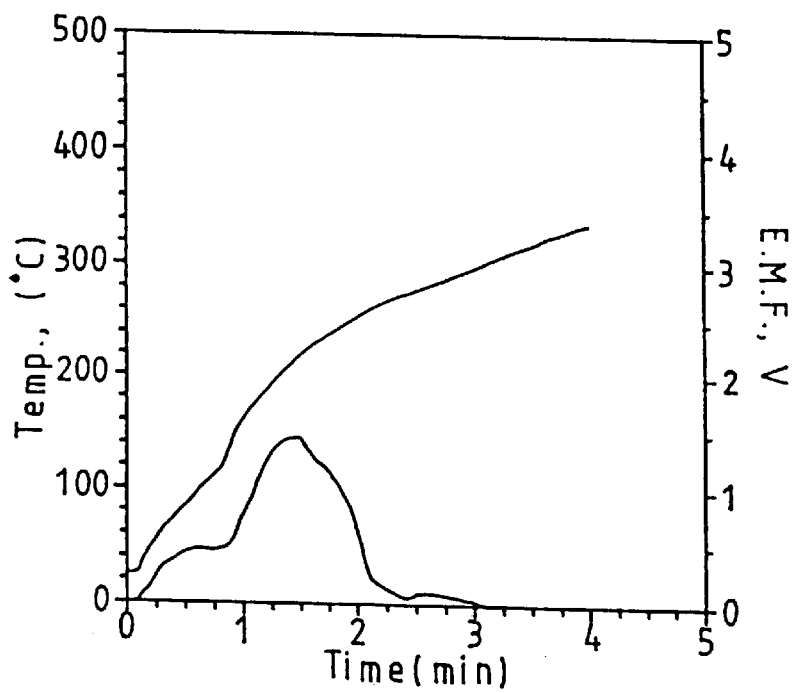
FIG. 3A is a graph of the electric conductivity and the temperature as a function of time in the reaction of lead nitrate anhydride and urea.
Figure 3B:
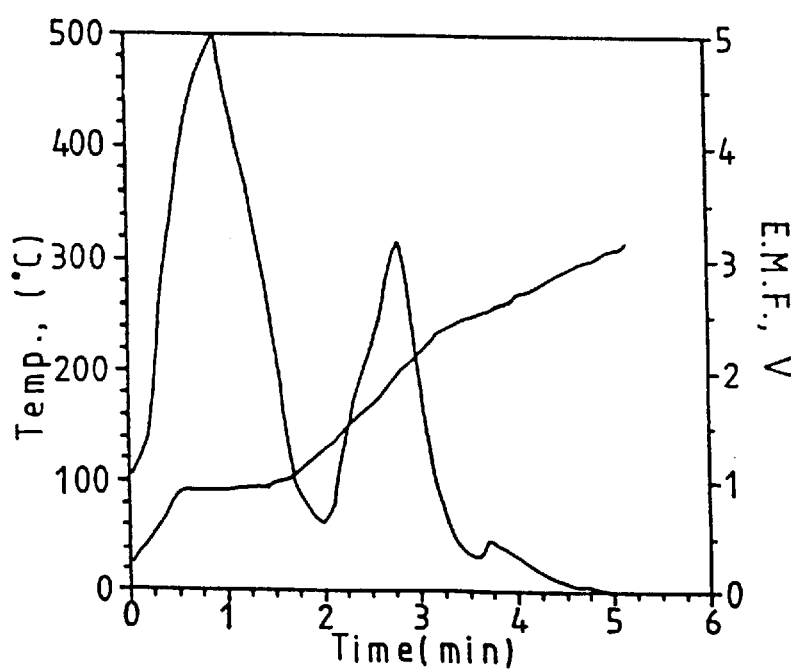
FIG. 3B is a graph of the electric conductivity and the temperature as a function of time in the reaction of lead nitrate solution and urea.

The fact that a small amount of water must be present in the second step, the homogeneous melt formation step as referred above, can be ascertained in FIG. 3A and FIG. 3B, which show the result of the third step, that the homogeneous melt was maintained. FIG. 3A is a drawing showing the measured electric conductivity according to temperature for the mixture of lead nitrate anhydride and urea. FIG. 3B is a drawing showing the electric conductivity according to temperature for the mixture of lead nitrate and urea. With lead nitrate anhydride there was no increase in the electric conductivity when a homogeneous melt was formed. A homogeneous melt could not be observed by examination with the naked eye. However, with lead nitrate solution, a homogeneous melt and an increase in electric conductivity were observed. From this result it can be confirmed that a small quantity of water must be present for the formation of a homogeneous melt.

4. The Fourth Step

Decomposition Step of the Homogeneous Melt

The fourth step, illustrated as "D" in FIG. 2A and FIG. 2B, is the step where the electric conductivity and the weight decrease greatly at the same time because the compound of constant composition ratio undergoes an exothermic decomposition reaction thoroughly according to the increase of the temperature, and at this point the ion concentration of the melt is decreased. Because the fourth step is performed quickly (over only several minutes), homogeneity of the melt is maintained without causing any segregation.

IV. Analysis of Homogeneity of the Prepared Sample

In order to determine the suitability of the decomposed products of the present invention as precursors for complex oxides, the products obtained were calcined and their structures were analyzed by X-ray pattern. The results showed them to be single phase crystals of a complex oxide. It was also found that the calcination temperature was lower. For practical purposes, the precursor should be a uniform chemical composition with a fine particle size. Fluorescence analysis was performed to compare the miscibility of the product obtained by the present invention with the miscibility of the powder obtained by powder mixing method (component oxides), which have been widely used to produce complex oxides by using EDAX quantitative analysis. It was found that the decomposed product had homogeneous miscibility regardless of the starting mixing ratio of each component elements.

1. Electric Conductivity and Miscibility

When multiple elements are mixed, the most favorable mixing can be obtained when each element is mixed homogeneously at the atomic or molecular level. In order to attain this result, the phase of the mixture should be liquid or gas. When the mixture is a liquid, the component particles should have an atomic or ionic state. If they are in an ionic state, the electric conductivity is much larger than that of molecular or any other colloidal state. Thus the electric conductivity should be an indirect measure of the degree of mixing. As described in the experiment of the decomposition reaction of zinc nitrate and lead nitrate and urea, it was found that a transparent and homogeneous solution was formed at a temperature of 130–170° C. and maintained for a while without any weight loss during the decomposition reaction. Further, the electric conductivity of the solution increased remarkably during the period. These phenomena occurred not only when a single element was decomposed but also when the mixture of metal nitrates of more than two elements and urea was decomposed. By no means could the metal nitrate and urea be in the state of ionic compounds in the melt. Therefore it is certain that each element was appropriately mixed in the atomic level or in the ionic level.

With respect to the electric conductivity and miscibility during the formation procedure of the decomposed products of yttrium nitrate, aluminium nitrate, and urea, the sample also maintained the transparent melt at the temperature of 170° C. just prior to the decomposition. During the period of melt, decomposition of the sample also hardly proceeded (i.e. without weight loss). YAG can be synthesized at a low temperature because the decomposed products are appropriately mixed even though it is amorphous. Therefore the decomposed products obtained via this stage give high homogeneity.

2. Determination of Homogeneity By Fluorescence Analysis

Figure 4A:
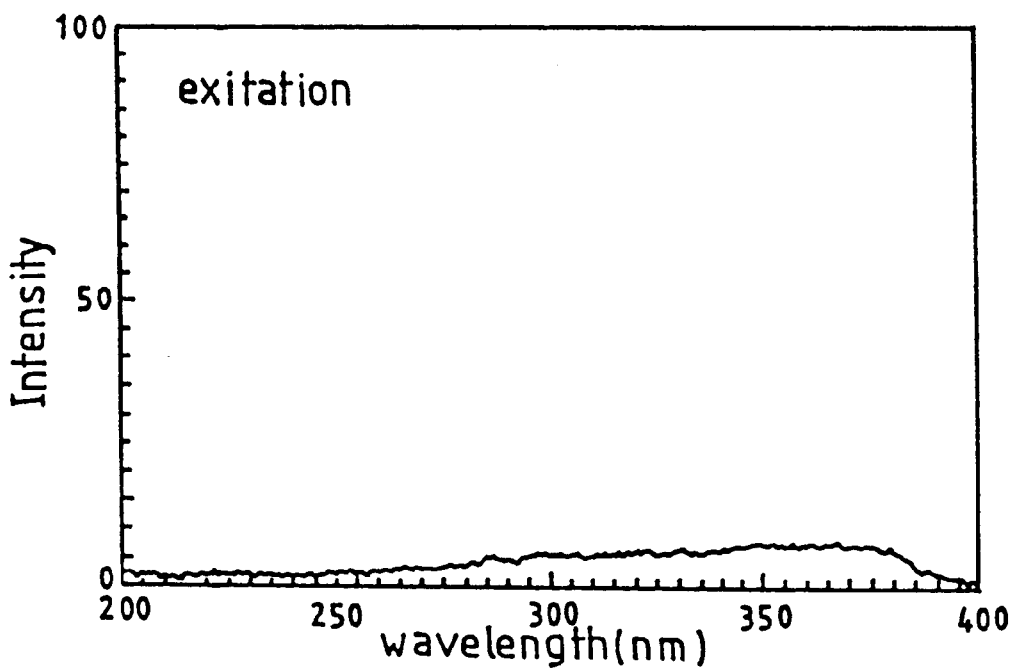
FIG. 4, consisting of FIGS. 4A and 4B, is a spectrum showing the fluorescence property of the mixture of zinc oxide and terbium oxide at a mole ratio of 99:1.
Figure 4B:
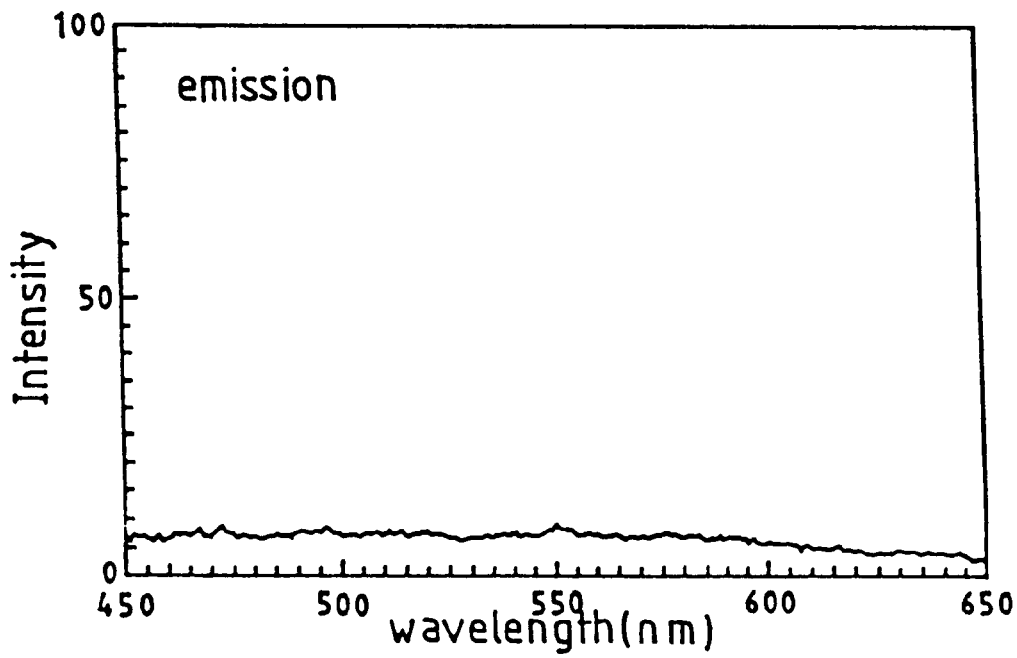
Figure 5A:
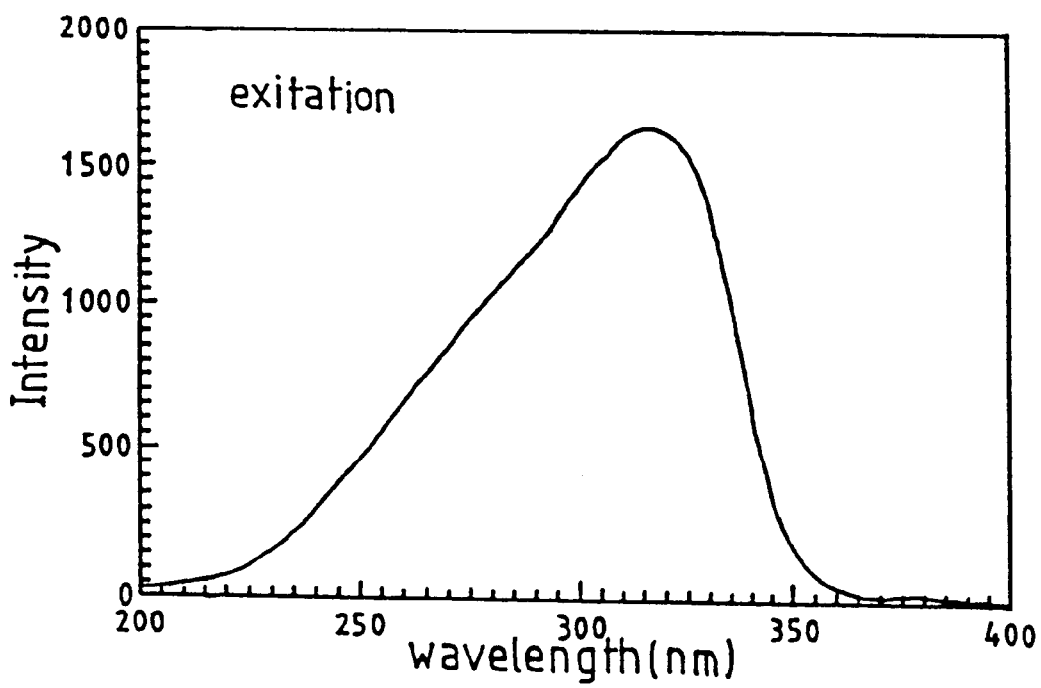
FIG. 5, consisting of FIGS. 5A and 5B, is a spectrum showing the fluorescence property of a decomposed product obtained by dissolving zinc oxide and terbium oxide having the mixing ratio indicated in FIG. 4 in nitric acid, adding 2 equivalents of urea in the combustion mixing ratio of nitrate to urea and decomposing at 300° C.
Figure 5B:
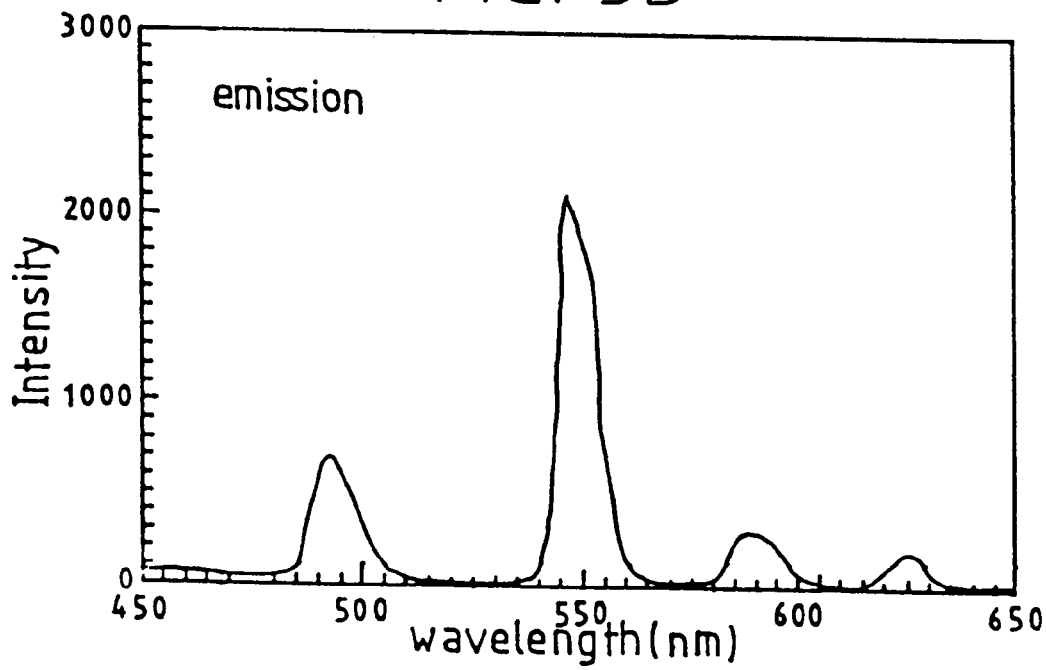

A mixture of zinc oxide and terbium oxide is used for the advanced varistor. The miscibility of the product of the present invention was compared with that of the conventional powder mixing process. Even though ordinarily praseodymium is contained in this material and it is also known as a rare-earth element having fluorescence, the strength is too weak to test the fluorescence property. Accordingly, terbium was used as a substitute for the praseodymium. The sample was prepared by adding 1.0 mol % of terbium oxide to zinc oxide to produce a sample, and the two oxides were mixed as completely as possible by alumina ball mill (for 24 hours) using water as medium. The mixed sample was dried in a dryer at 90° C. until the water was completely evaporated and then pounded finely using an agate mortar. The fluorescence property of the prepared sample is shown in FIG. 4. The fluorescence does not normally show for inhomogeneous mixtures or for the segregated oxides. FIG. 4 depicts the fluorescence spectrum (absorption and emission) of the mixture formed from the mixture of zinc oxide and terbium oxide with a mole-ratio of 99:1. As shown in FIG. 4, there is no absorption at any wavelength and no fluorescence. This indicates that the sample was not mixed completely. FIG. 5 shows the results obtained from zinc oxide and terbium oxide with the same mixing ratio as above which was dissolved in the equivalent ratio of nitric acid and also 2 equivalents of urea and decomposed at 300° C. FIG. 5 depicts the fluorescence property of this sample.

According to the above results, it is clear that each component element of the product obtained by the invention gives good homogeneity.

3. Determination of Homogeneity by EDAX Analysis

The most important part of the process of the present invention is to form a homogeneous melt and to have good homogeneity in the final product. The EDAX analysis can determine quantitatively the contents of the each metal component.

Figure 6:
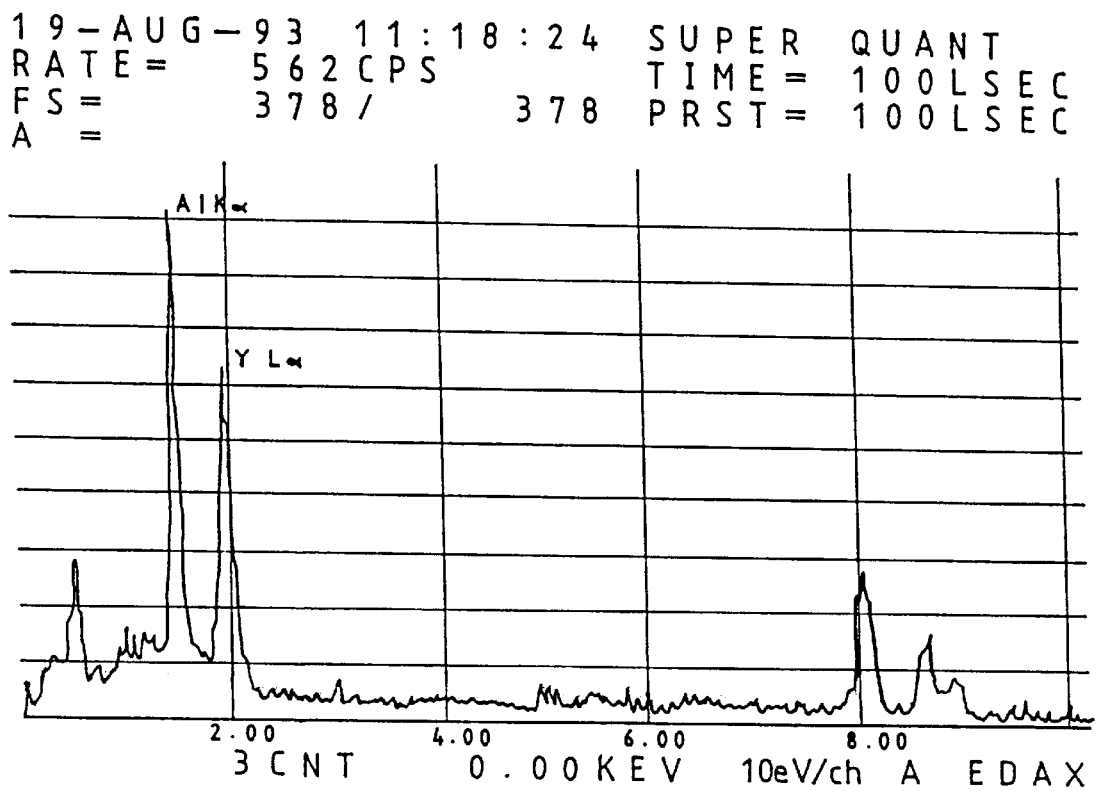
FIG. 6 is a graph of an EDAX pattern of a complex oxide precursor of a YAG composition obtained by adding 2.4 wt % of praseodymium.
Figure 7A:
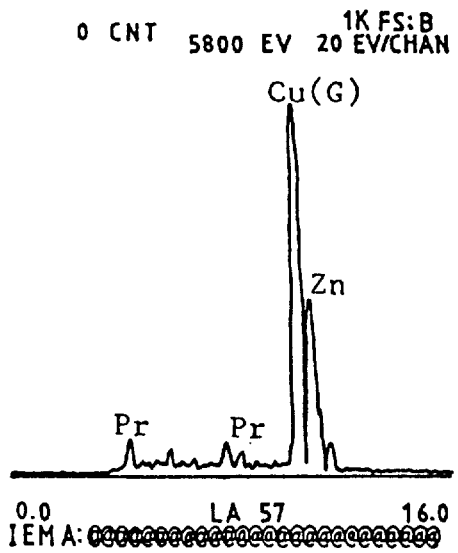
FIG. 7 consisting of FIGS. 7A, 7B, 7C and 7D, is a graph of an EDAX pattern of decomposed products obtained from various mixing ratios of zinc and praseodymium.
Figure 7B:
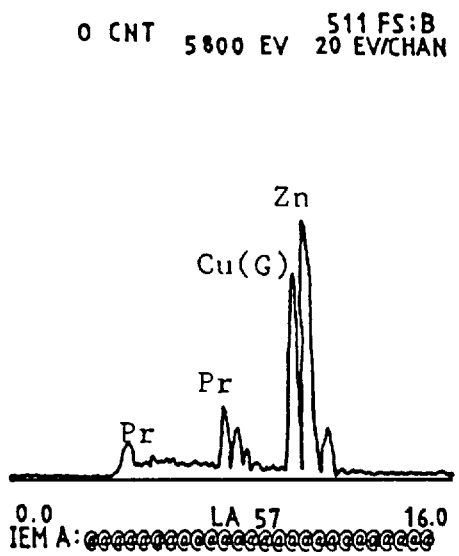
Figure 7C:
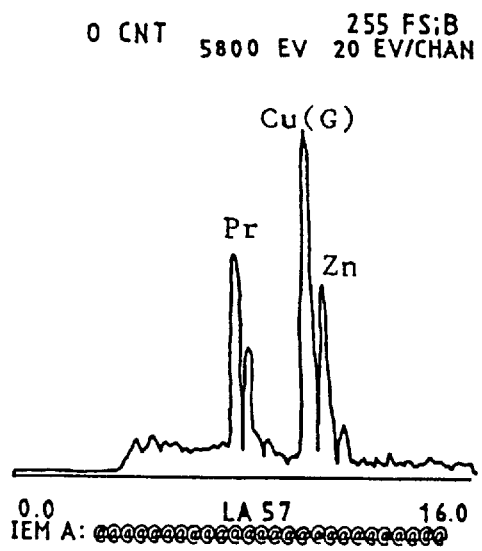
Figure 7D:
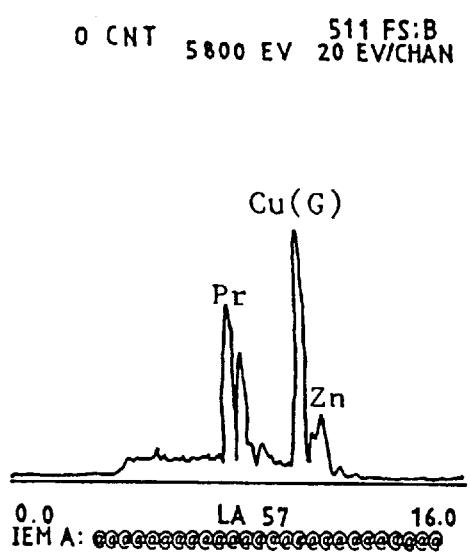

The results of the EDAX analysis for the product from the mixture of yttrium nitrate, aluminium nitrate, and urea are as follows: a raw sample in which Pr was substituted for some parts of Y was first made and the products of Pr:YAG were made by the thermal decomposition, and then the quantitative analysis was performed for the each component (Y, Pr, Al) of the powder at various positions. If the composition ratio is the same at any point, it means that it is homogeneously mixed. The results obtained by these content analyses are shown in the Table 1, and the EDAX pattern is shown in FIG. 6.

TABLE 1

Chemical Composition of amorphous Pr doped (2.4%) YAG Element atom (%)

|  |  | Y | Al | Pr |
|---|---|---|---|---|
| Theoretical value (%) |  | 35.100 | 62.500 | 2.400 |
| Point | 1 | 32.575 | 66.069 | 1.329 |
| No. | 2 | 34.403 | 64.642 | 0.955 |
| in | 3 | 33.351 | 63.234 | 3.415 |
| the | 4 | 32.598 | 65.145 | 2.257 |
| Sample | 5 | 38.106 | 59.941 | 1.954 |
|  | 6 | 32.575 | 66.096 | 1.329 |
|  | 7 | 42.411 | 55.212 | 2.377 |
| Average (%) |  | 35.146 | 62.090 | 1.945 |
| Deviation (%) |  | +0.046 | +0.409 | −0.455 |

As shown in Table 1, the amount thereon was nearly similar to the added amount regardless of small variations at each position. Therefore it can be inferred that the distribution of each element is homogeneous in the decomposed products. Further it is evident that every component was homogeneously mixed at a microscopic scale as the EDAX analysis was performed in the narrow beam range of 50 Å at each position.

However it cannot be said definitely that all are homogeneous based on the above analysis which is based on the fixed composition. In order to confirm the uniformity of complex oxide it is better to observe the effect of the composition ratio of two components. Therefore, comparison was made to two metals having different atomic binding radius of 1.33 Å (Zn) and 1.82 Å (Pr) at different mixing ratios.

Zinc nitrate solution and praseodymium nitrate solution at the measured concentrations were mixed in four mixing ratios of Zn:Pr equal to 1:9, 3:7, 5:5, and 9:1. The appropriate amount of urea to form a homogeneous solution was added to the solution, and the decomposition reaction proceeded in a tubular furnace at 400° C. Each solution was heated to form a homogeneous solution and then decomposed to obtain the decomposed product. The data from an EDAX analysis obtained with the decomposed product was compared with the initial amount of the zinc and praseodymium. FIG. 7 shows the EDAX patterns of the decomposed products where the mixing ratios of zinc and praseodymium are different. As shown in FIG. 7, the amount of signals indicating the K shell of praseodymium is increased in proportion to the amount of the praseodymium. Table 2 shows the results of EDAX analysis on the decomposed products obtained by mixing zinc and praseodymium in four mixing ratios. The results were converted to quantitative values.

TABLE 2

Chemical composition of Pr—Zn sample with various mixing ratios

| mol-ratio (theoretical value) Zn:P | mol-ratio (experimental value) Zn:Pr |
|---|---|
| 10:90 | 15.3:84.7 |
| 30:70 | 30.1:69.9 |
| 50:50 | 53.1:46.9 |
| 90:10 | 88.4:11.6 |

In accordance with the results shown in Table 2, if the permissible error limit is allowed, the decomposed product prepared by the process of the invention has achieved mixing at atomic or molecular level regardless of the mixing ratios of the elements forming the complex oxide.

From the above results, therefore, it can be inferred that the present process is applicable to only complex oxides regardless of the composition ratio of the each element.

V. Compound of Metal Nitrate and Urea

The subject of the present invention is to produce a homogeneous solution by heating the compound of metal nitrate and urea. Therefore it is important to examine the conditions under which the homogeneous solution can be formed.

When the mixture of metal nitrate and urea is heated, the metal nitrate is dissolved in water in a hydrated state and then is dissociated to metal ions and nitrate ions. The solubility of urea is increased as the temperature is raised. Urea has a larger tendency to bond with metal ions rather than with water because the dipole moment of urea is larger than that of water in the aqueous solution. Therefore urea can substitute for the water hydrated with the metals and form bonds with metals in the aqueous solution. The above property is clear because the melting point of the urea compound, where urea substitutes for the water, is higher than the melting point of the hydrated metal nitrate.

Table 3 summarizes the formation of complex compounds from various kinds of metal nitrates with urea depending on metals. It shows that various metals and urea can form complex compounds. In other words, it can be predicted that metals listed in Table 3 will form the homogeneous melt (compound of nitrate and urea) that will have the desired electric conductivity. Namely, the complex ions can be formed when a four-component system, metal-nitrate ion-urea-water, is combined in the proper mixing ratio.

When mixed metal species form complex ions with urea, these metal species become homogeneously mixed where each metal species is adjacent to the space of ionic particles. Under these homogeneous mixing conditions, if hydrogen and nitrogen compounds except for metal species are decomposed and expelled out of the system in gaseous state rapidly at the same time, the metal component particles only will remain in a state of amorphous phase due to lack of time for atomic arrangement. If the amorphous solid is heated at an appropriate crystalline temperature and converted to a single complex oxide phase, it can be called a complex oxide precursor.

TABLE 3

Metal-urea complex oxide

| metal | complex form |
|---|---|
| Li | $LiNO_3 \cdot 2CO(NH_2)_2$ |
|  | $LiNO_3 \cdot 3CO(NH_2)_2$ |
| Na | $NaNO_3 \cdot CO(NH_2)_2$ |
|  | $NaNO_3 \cdot CO(NH_2)_2 \cdot H_2O$ |
| Mg | $Mg(NO_3)_2 \cdot 2CO(NH_2)_2 \cdot 4H_2O$ |
|  | $Mg(NO_3)_2 \cdot 2CO(NH_2)_2 \cdot 6H_2O$ |
|  | $Mg(NO_3)_2 \cdot 4CO(NH_2)_2$ |
|  | $Mg(NO_3)_2 \cdot 4CO(NH_2)_2 \cdot 2H_2O$ |
|  | $Mg(NO_3)_2 \cdot 6CO(NH_2)_2$ |
| Ca | $Ca(NO_3)_2 \cdot CO(NH_2)_2 \cdot 3H_2O$ |
|  | $Ca(NO_3)_2 \cdot 4CO(NH_2)_2$ |
| Cr | $Cr(NO_3)_3 \cdot 6CO(NH_2)_2 \cdot 3H_2O$ |
| Mn | $Mn(NO_3)_2 \cdot 2CO(NH_2)_2 \cdot 4H_2O$ |
|  | $Mn(NO_3)_2 \cdot 4CO(NH_2)_2$ |
|  | $Mn(NO_3)_2 \cdot 4CO(NH_2)_2 \cdot 2H_2O$ |
| Fe | $Fe(NO_3)_3 \cdot 6CO(NH_2)_2$ |

TABLE 3-continued

Metal-urea complex oxide

| metal | complex form |
|---|---|
| Co | $Co(NO_3)_2.CO(NH_2)_2$ |
|  | $Co(NO_3)_2.CO(NH_2)_2.8H_2O$ |
|  | $Co(NO_3)_2.2CO(NH_2)_2.4H_2O$ |
|  | $Co(NO_3)_2.4CO(NH_2)_2$ |
|  | $Co(NO3)_2.6CO(NH_2)_2$ |
|  | $Co(NO_3)_2.6CO(NH_2)_2.2H_2O$ |
|  | $Co(NO_3)_2.10CO(NH_2)_2$ |
|  | $Co(NO_3)_2.10CO(NH_2)_2.2H_2O$ |
| Ni | $Ni(NO_3)_2.2CO(NH_2)_2.2H_2O$ |
|  | $Ni(NO_3)_2.2CO(NH_2)_2.4H_2O$ |
|  | $Ni(NO_3)_2.2CO(NH_2)_2.6H_2O$ |
|  | $Ni(NO_3)_2.4CO(NH_2)_2$ |
|  | $Ni(NO_3)_2.10CO(NH_2)_2$ |
| Cu | $Cu(NO_3)_2.4CO(NH_2)_2$ |
|  | $Cu(NO_3)_2.6CO(NH_2)_2$ |
| Zn | $Zn(NO_3)_2.2CO(NH_2)_2.5H_2O$ |
|  | $Zn(NO_3)_2.4CO(NH_2)_2$ |
|  | $Zn(NO_3)_2.4CO(NH_2)_2.2H_2O$ |
| Ag | $AgNO_3.CO(NH_2)_2$ |
| Cd | $Cd(NO_3)_2.4CO(NH_2)_2.3H_2O$ |
| Hg | $Hg(NO_3)_2.CO(NH_2)_2.H_2O$ |
| Sc | $Sc(NO_3)_3.CO(NH_2)_2.3H_2O$ |
|  | $Sc(NO_3)_3.4CO(NH_2)_2$ |
|  | $Sc(NO_3)_3.7CO(NH_2)_2$ |
| Y | $Y(NO_3)_3.3CO(NH_2)_2$ |
|  | $Y(NO_3)_3.4CO(NH_2)_2$ |
| Ce | $Ce(NO_3)_3.2CO(NH_2)_2.H_2O$ |
|  | $Ce(NO_3)_3.5CO(NH_2)_2$ |
|  | $Ce(NO_3)_38CO(NH_2)_2$ |
| Pr | $Pr(NO_3)_2.2CO(NH_2)$ |
|  | $Pr(NO_3)_2.4CO(NH_2)_2$ |
|  | $Pr(NO_3)_2.6CO(NH_3)_2$ |
| Nd | $Nd(NO_3)_3.CO(NH_2)_2.3H_2O$ |
| Eu | $Eu(NO_3)_3.2CO(NH_2)_2.2H_2O$ |
|  | $Eu(NO_3)_3.4CO(NH_2)_2.2H_2O$ |
|  | $Eu(NO_3)_3.6CO(NH_2)_2$ |
| Gd | $Gd(NO_3)_3.2CO(NH_2)_2$ |
|  | $Gd(NO_3)_3.4CO(NH_2)_2$ |
| Dy | $Dy(NO_3)_3.3CO(NH_2)_2$ |
|  | $Dy(NO_3)_3.4CO(NH_2)_2$ |
| Ho | $Ho(NO_3)_3.3CO(NH_2)_2$ |
|  | $Ho(NO_3)_3.4CO(NH_2)_2$ |
| Er | $Er(NO_3)3.3CO(NH_2)_2.2H_2O$ |
|  | $Er(NO_3)_3.4CO(NH_2)_2$ |
| Tm | $Tm(NO_3)_3.3CO(NH_2)_2$ |
|  | $Tm(NO_3)_3.4CO(NH_2)_2.2H_2O$ |
| Yb | $Yb(NO_3)_3.CO(NH_2)_2$ |
|  | $Yb(NO_3)_3.4CO(NH_2)_2$ |
| Lu | $Lu(NO_3)_3.4CO(NH_2)_2$ |
| Th | $Th(NO_3)_4.2CO(NH_2)_2.H_2O$ |
|  | $Th(NO_3)_4.4CO(NH_2)_2.4H_2O$ |
|  | $Th(NO_3)_4.6CO(NH_2)_2.2H_2O$ |
|  | $Th(NO_3)_4.7CO(NH_2)_2.2½H_2O$ |
|  | $Th(NO_3)_4.10CO(NH_2)_2$ |
|  | $Th(NO_3)_4.11CO(NH_2)_2.2½H_2O$ |
| U | $UO_2(NO_3)_2.CO(NH_2)_2.H_2O$ |
| $(UO_2^2)$ | $UO_2(NO_3)_2.2CO(NH_2)_2$ |
|  | $UO_2(NO_3)_2.3CO(NH_2)_2$ |
|  | $UO_2(NO_3)_2.4CO(NH_2)_2$ |
|  | $UO_2(NO_3)_2.4CO(NH_2)_2.H_2O$ |
|  | $UO_2(NO_3)_2.5CO(NH_2)_2$ |
|  | $UO_2(NO_3)_2.5CO(NH_2)_2.H_2O$ |
|  | $UO_2(NO_3)_2.6CO(NH_2)_2$ |
| Al | $Al(NO_3)_3.6CO(NH_2)_2$ |

VI. The Reaction of Metal Chloride and Urea

As it is difficult to prepare and store some metal nitrates, such as titanium and zirconium nitrates, the metal chloride can be converted to metal nitrate and can be alternatively used for preparation of the precursor by the present method.

1. Titanium

Figure 8:
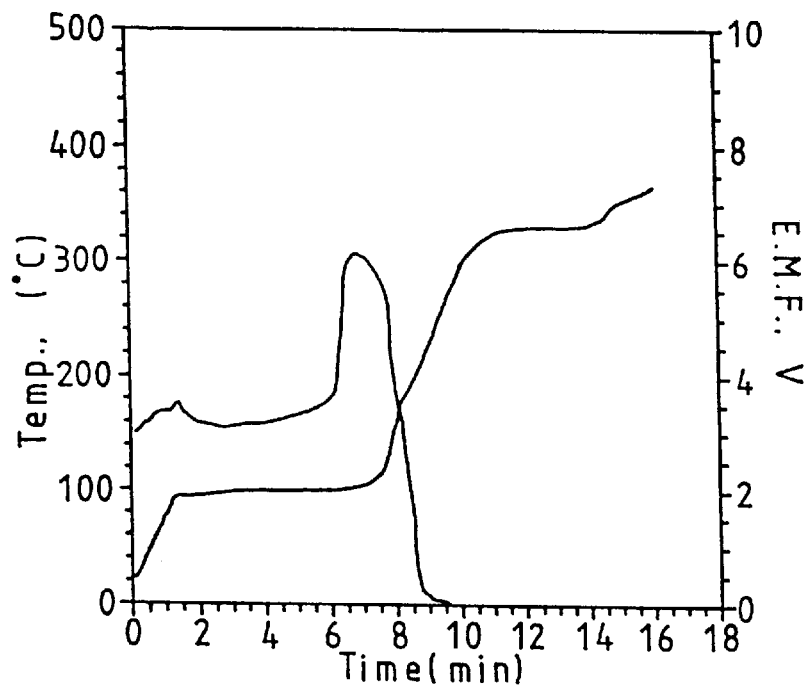
FIG. 8 is a graph of the electric conductivity and temperature as a function of time after reacting the mixture of titanium chloride aqueous solution and urea.
Figure 9:
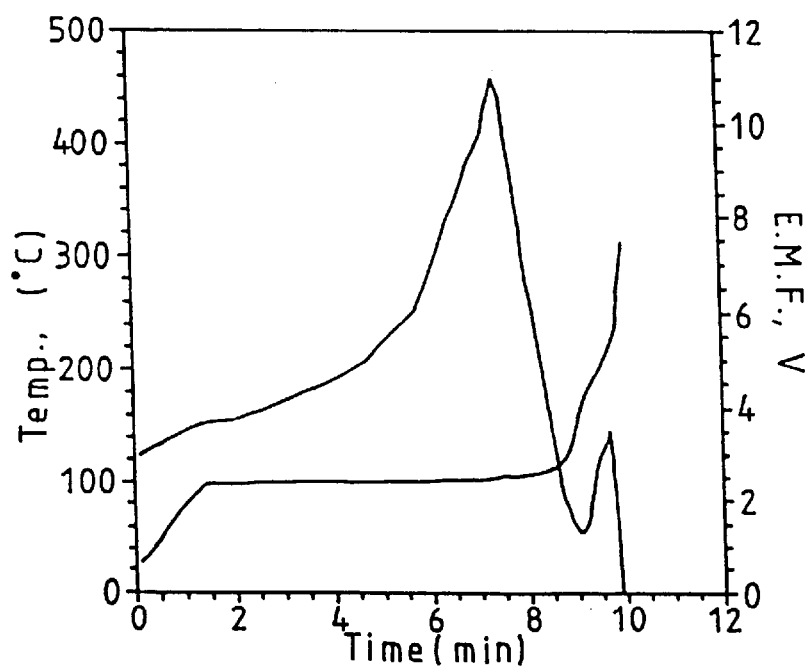
FIG. 9 is a graph of the electric conductivity and temperature after reacting the mixture of titanium chloride aqueous solution, urea and nitric acid.

In order to convert chloride to nitrate, water was added to titanium chloride ($TiCl_4$) supplied as a solution at ambient temperature, and then urea was added. Electric conductivity according to temperature was measured, and the result obtained is shown in FIG. 8. From FIG. 8, it can be seen that the electric conductivity continuously increased in proportion to the evaporation of water. After the completion of evaporation, however, the electric conductivity abruptly decreased due to the decomposition of the solution. A homogeneous melt did not, however, form in this case. Four (4) equivalent ratio nitric acid, which can make titanium be a nitrate, was added to the aqueous solution of titanium chloride, and then urea was added. The observed results of the electric conductivity showed no difference between the above mixture and the conventional mixture of nitrate and urea. The results are shown in FIG. 9, which depicts the electric conductivity for the decomposition behavior with temperature of the mixture of titanium chloride, nitric acid and urea.

Figure 10:
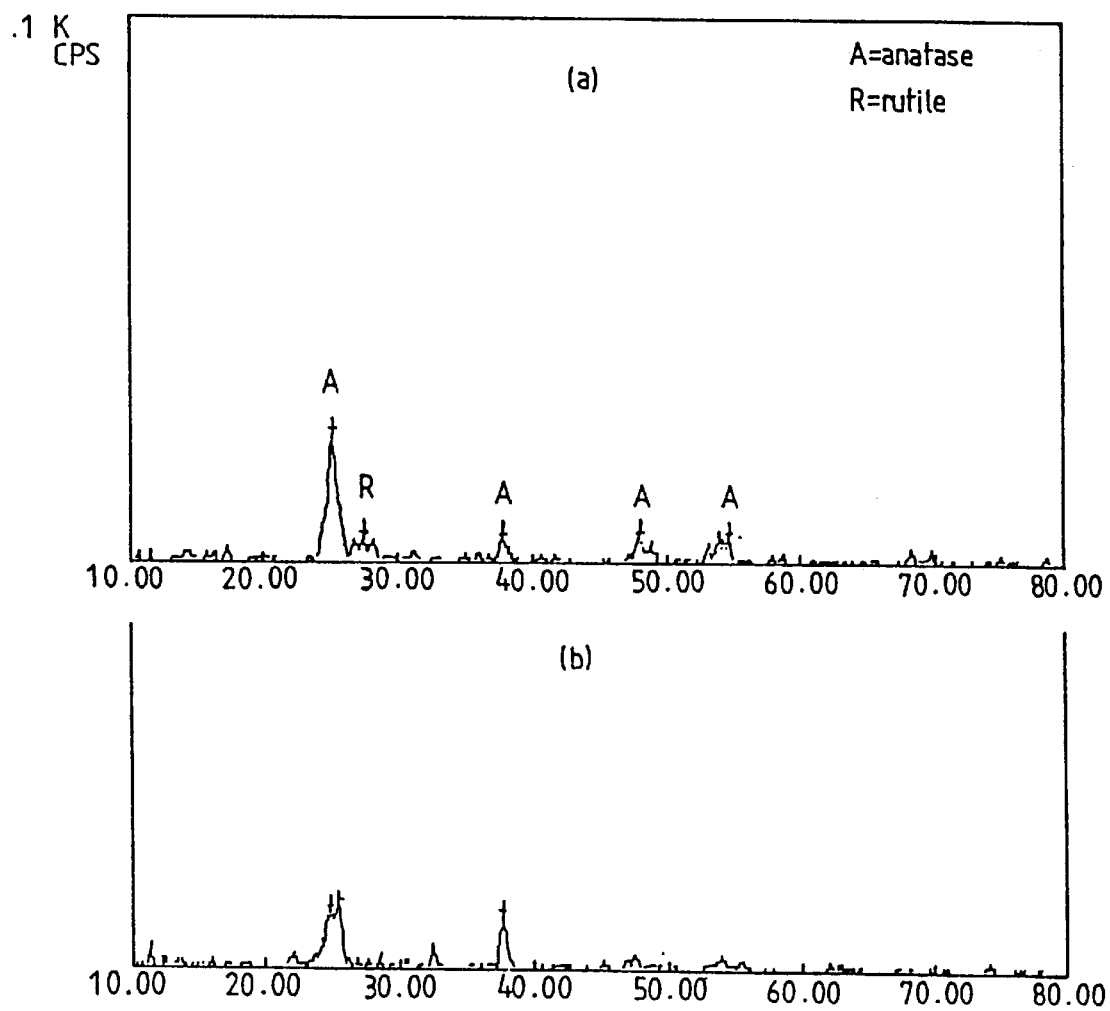
FIG. 10 is an X-ray diffraction pattern of decomposed products obtained from the mixture of FIGS. 8 and 9.

The XRD patterns of the decomposed products obtained in the above two cases are shown in FIG. 10. As shown in FIG. 10, while the decomposed product obtained from the mixture of titanium chloride and urea did not show a particular crystalline phase, it can be confirmed that the decomposed product obtained from the mixture of titanium chloride, urea and nitric acid contained the crystal of $TiO_2$ that is rutile and anatase. It is believed that the crystalline property was improved by the exothermic reaction of nitric acid and urea when nitric acid was added.

2. Zirconium

For zirconiom, zirconiom oxychloride ($ZrOCl_28H_2O$) was used as the metal chloride, and the decomposition process was observed.

The mixture of zirconiom oxychloride and urea, and the mixture of zirconium oxychloride and urea in which 4 equivalent ratio nitric acid was added, were prepared. The electric conductivity of the mixtures with temperature were measured. The results were identical to the case of titanium. Namely, when nitric acid was added, the electric conductivity was increased, and when the nitric acid was not added, the electric conductivity did not increase.

VII. Preparation of Crystalline Complex Oxide

1. Preparation of YAG

Figure 11:
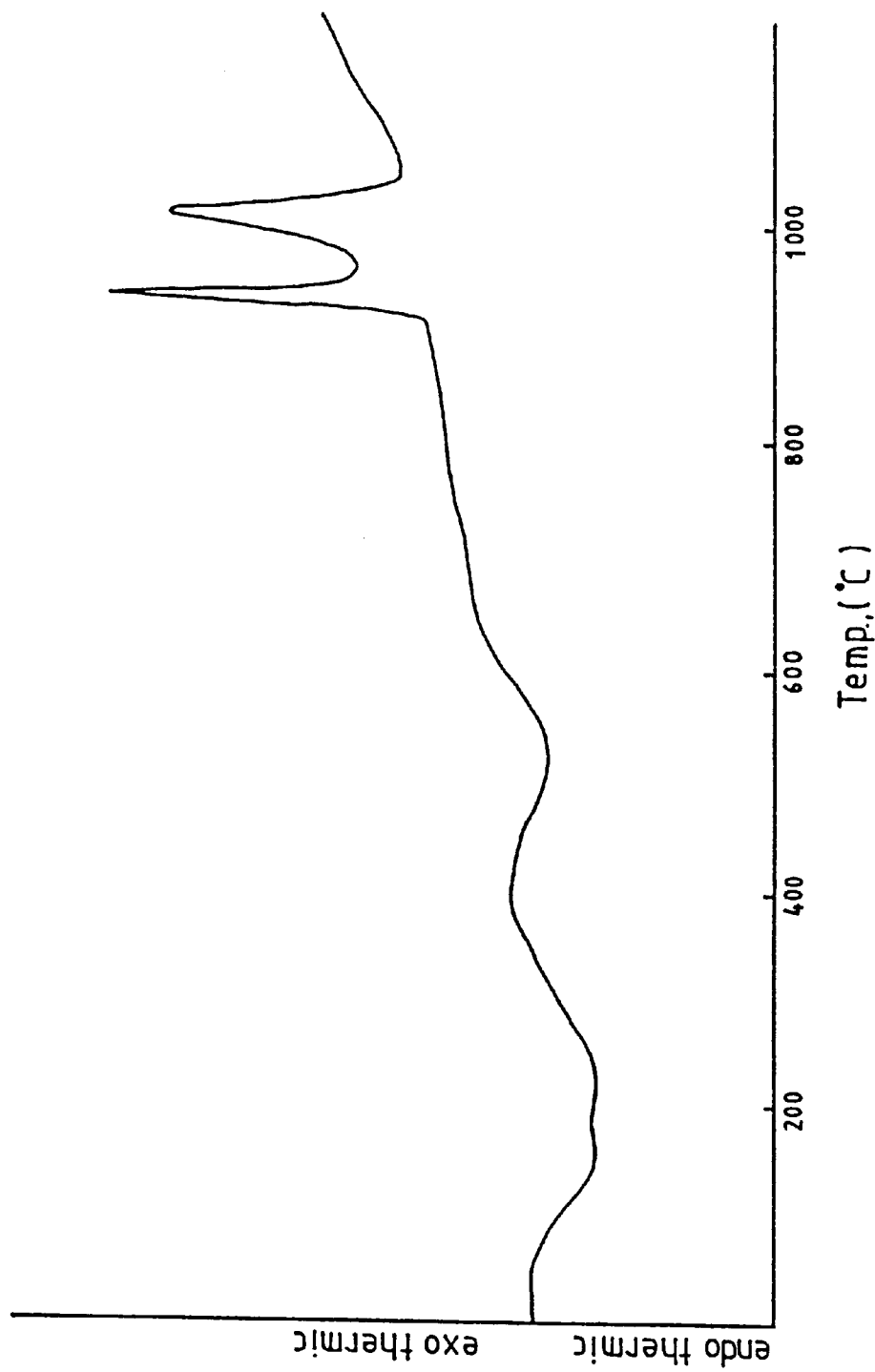
FIG. 11 is a graph of a differential thermogram of complex oxide precursor.
Figure 12:
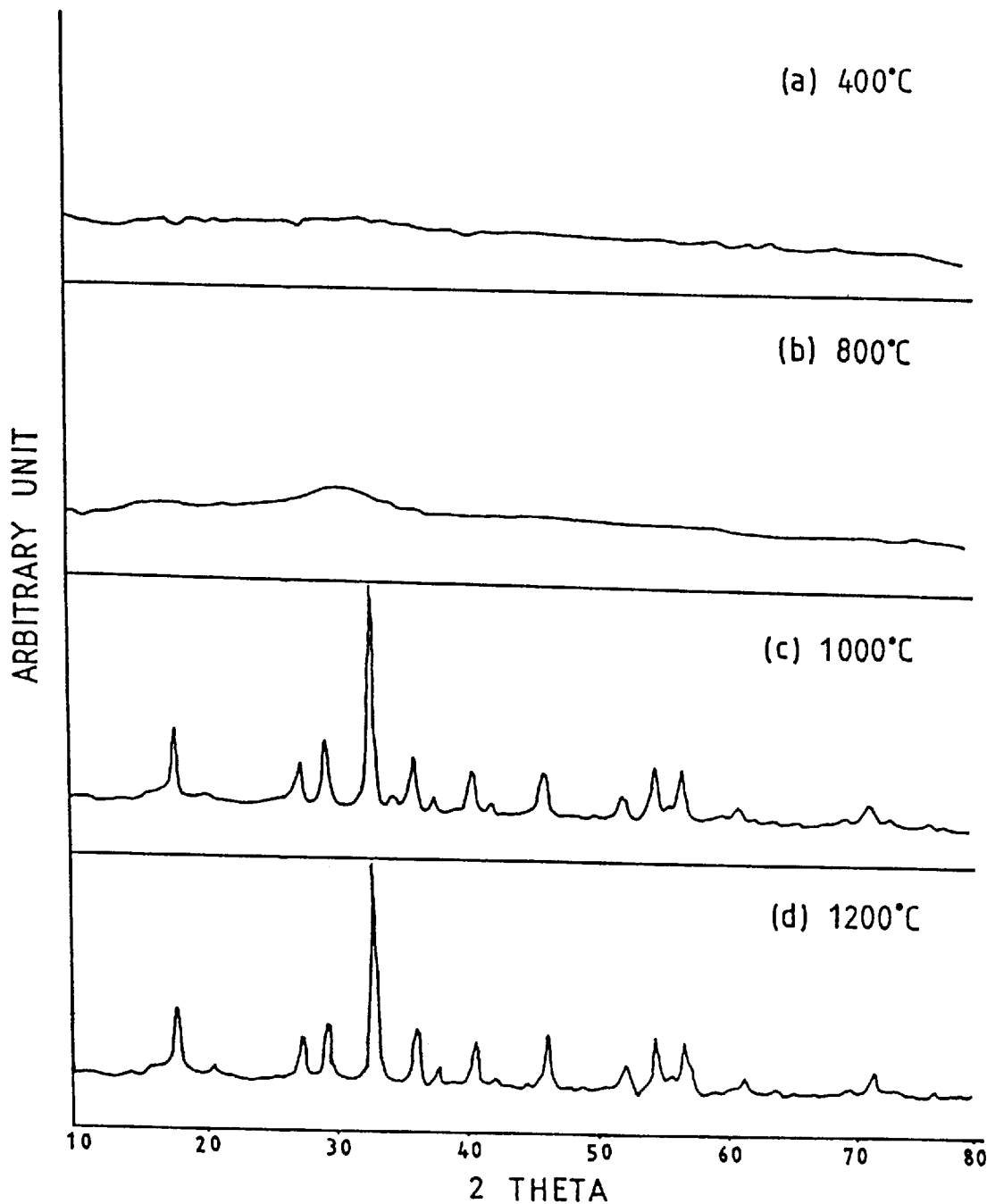
FIG. 12 is an X-ray diffraction pattern of products obtained by heating complex oxide precursors at various temperatures.
Figure 13:
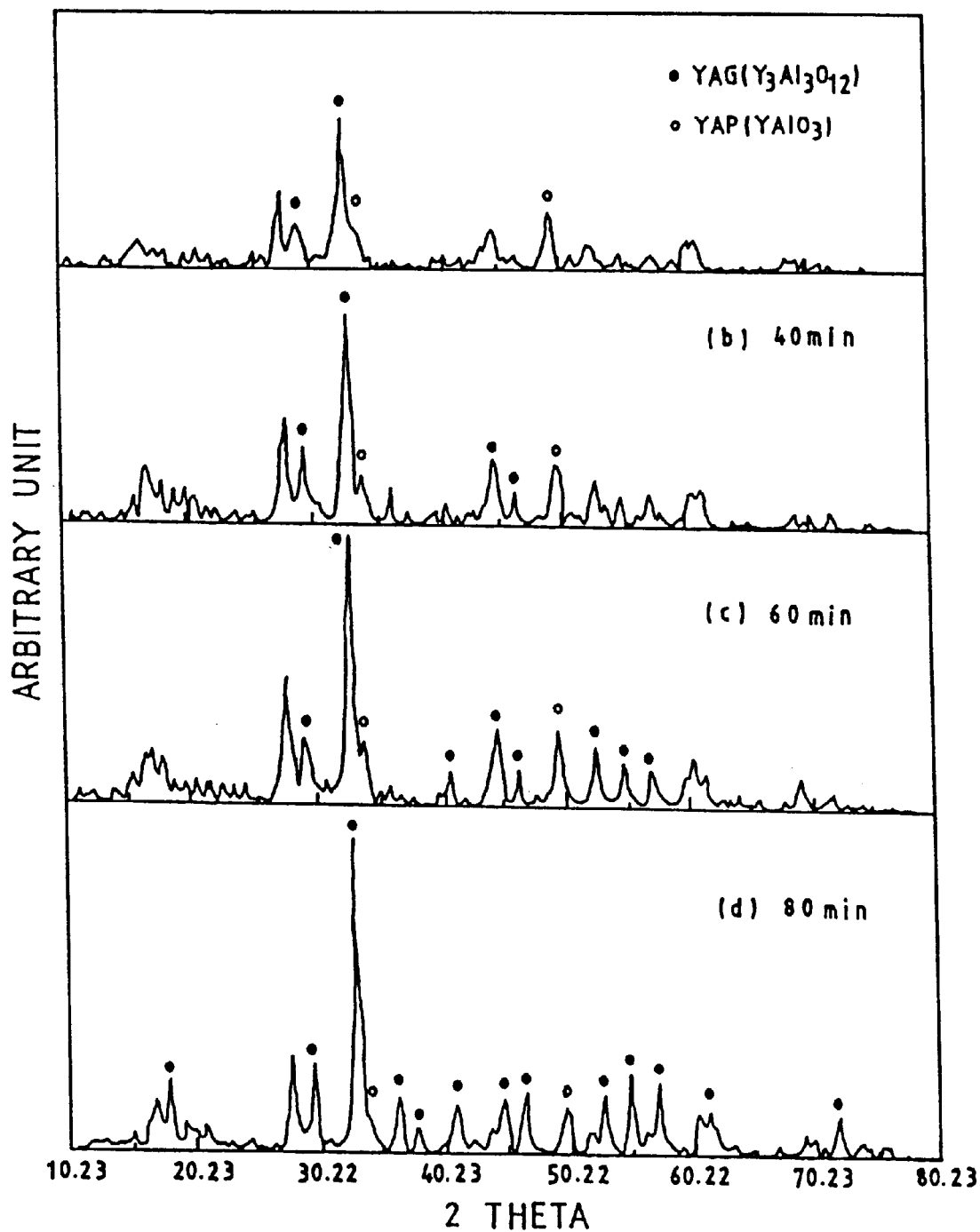
FIG. 13 is an X-ray diffraction pattern of products obtained after heating complex oxide precursors to 900° C. and maintaining the products for various times at that temperature.

An experiment was performed to produce a crystalline complex oxide using an amorphous complex oxide precursor of the present invention. Using the precursor, a phase-transition process was observed with heating. At first, differential thermal analysis curves were obtained at a constant rate (10° C./min), and the results are shown in FIG. 11. As shown in FIG. 11, the product showed three endothermic reaction peaks and two exothermic reactions. On the basis of this information, additional samples were separately heated to 600° C. (an endothermic reaction is nearly completed at this temperature), 8000° C. (an exothermic reaction begins just before this temperature), 10000° C. (an exothermic reaction is completed at this temperature) and 1200° C., and then the samples were kept at each of the temperatures for 10 minutes to obtain four products. A phase examination for the four products was performed, and the results are shown in FIG. 12. As shown in FIG. 12, the product heated to 1000° C. gave YAG phase, which means that no YAG phase can be obtained below 1000° C. without a longer period of heating. The phase examination for the products maintained for 20, 40, 60, and 80 minutes at these temperatures was also performed, and the results are shown in FIG. 13. As shown in FIG. 13, another phase appeared in addition to the YAG phase at 900° C., which was mainly the YAP phase and the peaks of the YAP phase was decreased with the progress of the time. However it is concluded that a single phase of YAG cannot be obtained at 900° C. because the sample heated for comparatively long time also gave a complex phase.

It was also confirmed that the crystal of YAG was easily obtained under the condition of maintaining the products at 10000° C. for 10 minutes. Therefore the decomposed products are suitable for the complex oxide precursor. The method of this invention is useful for industrial processes because the process of the present invention is much easier than the conventional liquid phase method and the control of the process condition is also simpler than that of the combustion method.

2. Producing a Varistor

The solution of metal nitrate and urea with the mixing ratio of 1:2 was heated at 300° C. for about 7 minutes, and the resulting powder of zinc oxide was doped with praseodymium, which is an advanced material used for manufacturing a varistor. This was because the component element miscibility of the decomposed product is completely homogeneous and characteristic performance as varistor has been confirmed to be excellent. The test procedure was as follows. The decomposed product was calcinated at 850° C. for 1 hour, a binder was added and then a pellet was produced under a pressure of 240 MPa. The prepared pallet was sintered at 1200° C. for 1 hour, and the texture was examined. It was found that the average size of the crystalline particles was about 1.5 µm. The electrical property test was conducted to give maximum yield voltage of about 1000 V/mm. The result thereof is superior to the results of other varistors produced by the conventional method.

VIII. Scheme for the Industrial Process

The method of mass production and continuous operations is important to extend the field of the industrial application and reduction of the processing cost. Since most of the final ceramic articles are produced through high temperature sintering, overall heat energy in the process can be saved if precursor is used as starting material instead of a crystalline one, provided that the material is homogeneous and has a fine grain. The precursor of this invention is a sort of intermediate product which suits this purpose both for the producer and user of this product.

The process of this invention comprises two stages: 1) heating to form a homogeneous melt, and 2) further heating to decompose the melt. The temperature and time encountered are not too high or too short, so that the process equipment and operation can be divided into the above two parts. Namely, the starting mixture of metal nitrates and urea (in solid or in solution form) is heated to form the homogeneous melt at a temperature in the range 150–250° C. in a constant temperature vessel where the mixture is continuously fed from one side and discharged as a melt from the other side. The melt is then led to the second vessel at around 300° C. where the introduced melt undergoes decomposition, yielding a complex oxide in a fine powder form. The gas from the decomposer can be collected and used as fuel or separated as a byproduct. The process is relatively simple in equipment and operation that it can be readily adopted in industry.

What is claimed is:

1. A process for preparing amorphous complex oxide precursors comprising the steps of:

mixing at least one hydrated metal nitrate solution, wherein the metal is selected from the group consisting of aluminum and rare earth elements, with carbohydrazide to produce a mixture;

heating the mixture in the presence of water in a controlled manner without ignition to a temperature that is sufficient to form a homogeneous melt; and further heating in a controlled manner without ignition at a heating rate of 1 to 100° C. per minute to decompose the melt and to form an amorphous complex oxide precursor.

2. A process for preparing complex oxide precursors as claimed in claim 1 wherein mol-ratio of metal to carbohydrazide is equal to or more than 1.

3. A process for preparing complex oxide precursors as claimed in claim 1, wherein the mixture further comprises metal chloride.

4. A process for preparing amorphous complex oxide precursors as claimed in claim 1, wherein the metal is selected from the group consisting of yttrium and aluminum.

5. A process for preparing crystalline complex oxides comprising the steps of:

mixing at least one hydrated metal nitrate solution, wherein the metal is selected from the group consisting of aluminum and rare earth elements, with carbohydrazide to produce a mixture;

heating the mixture in the presence of water within a temperature range from a first temperature sufficient to form a homogeneous melt at a heating rate of 1 to 100° C. per minute without ignition to produce an amorphous complex oxide precursor; and further heating the complex oxide precursor to a crystallizing temperature to form a crystalline complex oxide.

6. A process for preparing crystalline complex oxides as claimed in claim 5 wherein the complex oxide precursor is heated up to equal to or more than 300° C.

7. A process for preparing amorphous complex oxide precursors as claimed in claim 5, wherein the metal is selected from the group consisting of yttrium and aluminum.

8. A process for preparing amorphous complex oxide precursors comprising the steps of:

mixing at least one hydrated metal nitrate solution, wherein the metal is selected from the group consisting of aluminum and rare earth elements, with carbohydrazide to produce a mixture; and heating the mixture in the presence of water without causing it to ignite within a temperature range defined by a first temperature sufficient to form a homogeneous melt and a second temperature at a heating rate of 1 to 100° C. per minute to decompose the melt and to form an amorphous complex oxide precursor.

9. A process for preparing amorphous complex oxide precursors as claimed in claim 8, wherein the metal is selected from the group consisting of yttrium and aluminum.

* * * * *